US012755208B1

(12) United States Patent
Li et al.

(10) Patent No.: US 12,755,208 B1
(45) Date of Patent: Oct. 6, 2026

(54) SYSTEM AND METHOD FOR GENERATING HIGH QUALITY LABELED EXTRACTION DATASETS FOR TRAINING MACHINE LEARNING MODELS

(71) Applicant: Intuit Inc., Mountain View, CA (US)

(72) Inventors: Daniel Li, Frisco, TX (US); Tharathorn Joy Rimchala, San Francisco, CA (US); Preeti Duraipandian, Allen, TX (US); Sakshi Singla, Newark, CA (US); Sparsh Gupta, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/211,918

(22) Filed: May 19, 2025

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | |
|---|---|---|---|
| 6,917,926 B2 | 7/2005 | Chen et al. | |
| 11,232,255 B2 | 1/2022 | Dernoncourt et al. | |
| 12,111,797 B1 * | 10/2024 | Lum | G06F 16/24544 |
| 2005/0210008 A1 | 9/2005 | Tran et al. | |
| 2005/0267850 A1 | 12/2005 | Chen et al. | |
| 2019/0377984 A1 | 12/2019 | Ghanta et al. | |
| 2021/0271259 A1 | 9/2021 | Karpathy | |
| 2021/0326334 A1 * | 10/2021 | Shrivastava | G06F 16/2365 |
| 2023/0005248 A1 * | 1/2023 | Juillard | G06V 10/7784 |
| 2025/0045304 A1 * | 2/2025 | Quatro | G06N 20/00 |
| 2025/0147957 A1 * | 5/2025 | Verkruyse | G06F 16/24522 |

OTHER PUBLICATIONS

Zhang et al ("Efficient Data Labeling by Hierarchical Crowdsourcing with Large Language Models" Jan. 2025) (Year: 2025).*
Runtao Ren, "Large Language Model for Patent Concept Generation," Advanced Engineering Informatics 65 (2025) 103301, 16 pages.

(Continued)

*Primary Examiner* — Lut Wong
(74) *Attorney, Agent, or Firm* — Paradice & Li LLP

(57) ABSTRACT

A labeled extraction dataset for training machine learning models for information extraction tasks is generated using an ensemble of machine learning models serving as annotators. The plurality of annotators generate a plurality of labels and associated confidences for each field in an input data source. The plurality of labels for each field are consolidated to generate a single label and associated confidence per field of the input data source. The quality of the resulting label is scored to identify high quality and low quality labels. The high quality labels are stored in a final labeled extraction dataset and the low quality labels are provided to human labels for review and correction. The final labeled extraction dataset may then be used in training machine learning models for information extraction tasks such as document understanding.

20 Claims, 10 Drawing Sheets

(56) References Cited

OTHER PUBLICATIONS

Matthias Wirth, "Building Machine Translation Tools for Patent Language: A Data Generation Strategy at the European Patent Office," European Patent Office, 9 pages.
Lekang Jiang, "Artificial Intelligence Exploring the Patent Field," arXiv:2403.04105v1 [cs.AI] Mar. 6, 2024, 53 Pages.
Juan Rodriguez, "BigDocs: An Open Dataset for Training Multimodal Models on Document and Code Tasks," Published as a conference paper at ICLR 2025, https://bigdocs.github.io/, 57 pages.
Anonymous authors, "Understanding Large Language Models Through the Lens of Dataset Generation," Under review as a conference paper at ICLR 2024, 23 pages.
AI Assisted Alignment—LabelBox, https://labelbox.com/product/annotate/ai-assistance/, 5 pages.

* cited by examiner

500

| | field_name | page_number | data_type | reason |
|---|---|---|---|---|
| 0 | PAYER'S name, street address, city or town, province or state, country, and ZIP or foreign postal code | 0 | institution_address | This field is designed to capture the complete address of the institution or person making the payment, encompassing street address, city, state, country, and ZIP code. The structure and elements within this field strongly indicate it represents an address. |
| 1 | Reportable winnings | 0 | amount | The field "Reportable Winnings" is associated with a dollar sign ($) and is used to record a monetary value, indicating it represents an amount. |
| 2 | Date won | 0 | date | The field likely represents a date on which a particular event or transaction occurred, in this case, likely the date when the gambling winnings were earned or awarded. |
| 3 | Type of wager | 0 | raw_text | This field is intended for a free-form textual description of the specific type of wager that resulted in the gambling winnings. |
| 4 | Federal income tax withheld | 0 | amount | The presence of the dollar sign ($) adjacent to the field label strongly suggests that this field is intended for recording a numerical value representing an amount of money. The phrase "Federal income tax withheld" further clarifies that this amount specifically pertains to the amount of federal income tax that has been deducted or withheld from the gambling winnings. |
| 5 | Transaction | 0 | raw_text | This field likely serves as a reference or identifier for a specific transaction or instance of gambling winnings. It could potentially contain a unique code, number, or a brief description that distinguishes this particular transaction from others. |
| 6 | Race | 0 | raw_text | This field is likely intended to capture information about a race, potentially related to horse racing or a similar event. It could contain a race number, name, or other relevant details. |
| 7 | PAYER'S federal identification number | 0 | unique_identifier | This field is used to capture a unique identifier assigned to the payer, which is typically a business or organization. The term "federal identification number" suggests that it is a standardized identifier used for tax and other official purposes, making it a unique identifier. |
| 8 | PAYER'S telephone number | 0 | unique_identifier | This field is intended to store a unique identifier in the form of a telephone number, which can be used to establish contact with the payer. |
| 9 | Winnings from identical wagers | 0 | amount | The presence of the dollar sign ($) before the field name clearly indicates that this field is intended to capture a monetary value, making it an 'amount' data type. The phrase "Winnings from identical wagers" suggests that this field is used to record the total amount of winnings obtained from multiple wagers that are identical in nature. |
| 10 | Cashier | 0 | raw_text | This field is designed to capture information about the cashier who handled the transaction or payout. It could include the cashier's name, identification number, or other relevant details. |
| 11 | Winner's taxpayer identification no. | 0 | unique_identifier | This field is intended to capture a unique identifier assigned to the winner for tax purposes. The presence of the term "taxpayer identification no." strongly suggests that it represents a unique identifier used by tax authorities. |
| 12 | Window | 0 | raw_text | This field likely refers to a physical location or point of service where the gambling transaction or payout took place. It could be a window number, booth number, or a similar designation used to identify a specific location within a gambling establishment. |

FIG. 5

SYSTEM AND METHOD FOR GENERATING HIGH QUALITY LABELED EXTRACTION DATASETS FOR TRAINING MACHINE LEARNING MODELS

TECHNICAL FIELD

This disclosure relates generally to machine learning and more particularly relates to building an extraction dataset suitable for training and verification of an artificial intelligence system configured for document understanding.

BACKGROUND

Document understanding models are advanced Artificial Intelligence (AI) systems for detecting and classifying text, tables, and other key data from electronic documents. Document understanding models go beyond simple text recognition, such as Optical Character Recognition (OCR), and are used to interpret and extract meaningful information from documents based on understanding the structure, context, and relationships within the document. Document understanding models, for example, are used to transform unstructured data from documents into structured data for analysis and consumption. For example, document understanding models are sometimes used to automatically extract data from invoices, summarizing reports, parsing forms, etc.

These models are typically built on machine learning, often combining natural language processing (NLP) and computer vision. The models may be pre-trained on large datasets and are fine-tuned for specific document types. The training, e.g., fine-tuning, and evaluating machine learning models to automate document understanding requires large scale, high quality document data and extraction of ground truth. Ground truths, for example, are the correct, human-verified answers that the model uses as a reference to learn and evaluate its performance. Conventionally, ground truths are extracted from documents by manually annotating the data, e.g., using human labelers to annotate all information present in the document. While the use of human annotation generally produces accurate ground truths, it is expensive in time and labor. Moreover, humans can sometimes make mistakes, especially in information dense, multi-page documents. For example, US Tax Form 1040 and attached schedules contain 60-80 data elements (fields) that spread across 1-2 pages. Tasking human labelers to manually understand individual fields and accurately populate the correct field in a labeling user interface (UI) with the information present in the form across multiple pages is cognitively demanding. As the ground truth must be accurate, sometimes multiple human labelers are used to cross-check to ensure accuracy further increasing the expense in time and labor.

Accordingly, improvements in the production of training and verification datasets for machine learning models is needed.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

A labeled extraction dataset is generated for training machine learning models for information extraction tasks from a data source, such as data source understanding for text inputs, visual inputs, audio inputs, code or scientific data inputs, or a combination thereof, using an ensemble of machine learning models that serve as annotators. The machine learning model annotators produce a plurality of labels and associated confidence scores for each field in an electronic input data source. The plurality of labels for each field are consolidated using one or more consolidation processes to generate a single label and associated confidence score per field of the input data source. The quality of the resulting label is scored using one or more scoring processes to identify high quality and low quality labels. The high quality labels are stored in a final labeled extraction dataset while low quality labels may be provided for further review and correction, if necessary, prior to being stored in the final labeled extraction dataset, or being excluded without additional corrections from the final labeled extraction dataset. The final labeled extraction dataset contains only high quality labels (coming from the combination of the originally high quality labels and low quality labels that are corrected) which may then be used in training machine learning models for information extraction tasks.

One innovative aspect of the subject matter described in this disclosure can be implemented as a method for generating a labeled extraction dataset for training machine learning models for information extraction tasks. The method may include providing an input data source in an electronic format and a schema associated with the input data source to a plurality of annotators that are machine learning models and that each generate labels for the input data source based on the schema. The method further includes consolidating the labels generated for the input data source from the plurality of annotators into consolidated labels with a single label per field of the input data source and scoring quality of consolidated labels and identifying high quality consolidated labels and low quality consolidated labels based on a quality score of the consolidated labels. Additionally, the method further includes storing consolidated labels identified as high quality in a final labeled extraction dataset, and training a machine learning model for information extraction tasks using the final labeled extraction dataset.

One innovative aspect of the subject matter described in this disclosure can be implemented as a system configured for generating a labeled extraction dataset for training machine learning models for information extraction tasks. The system includes one or more processors and a memory communicatively coupled with the one or more processors and storing instructions that, when executed by the one or more processors, causes the one or more processors to be configured to provide an input data source in an electronic format and a schema associated with the input data source to a plurality of annotators that are machine learning models and that each generate labels for the input data source based on the schema. The one or more processors are further configured to consolidate the labels generated for the input data source from the plurality of annotators into consolidated labels with a single label per field of the input data source and score quality of consolidated labels and identifying high quality consolidated labels and low quality consolidated labels based on a quality score of the consolidated labels. Additionally, the one or more processors are further configured to store consolidated labels identified as high quality in a final labeled extraction dataset, and train a machine learning model for information extraction tasks using the final labeled extraction dataset.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 illustrates zero-shot schema inference results that may be produced, in accordance with some implementations.

Like reference numbers and designations in the various drawings indicate like elements.

DETAILED DESCRIPTION

Figure 1:
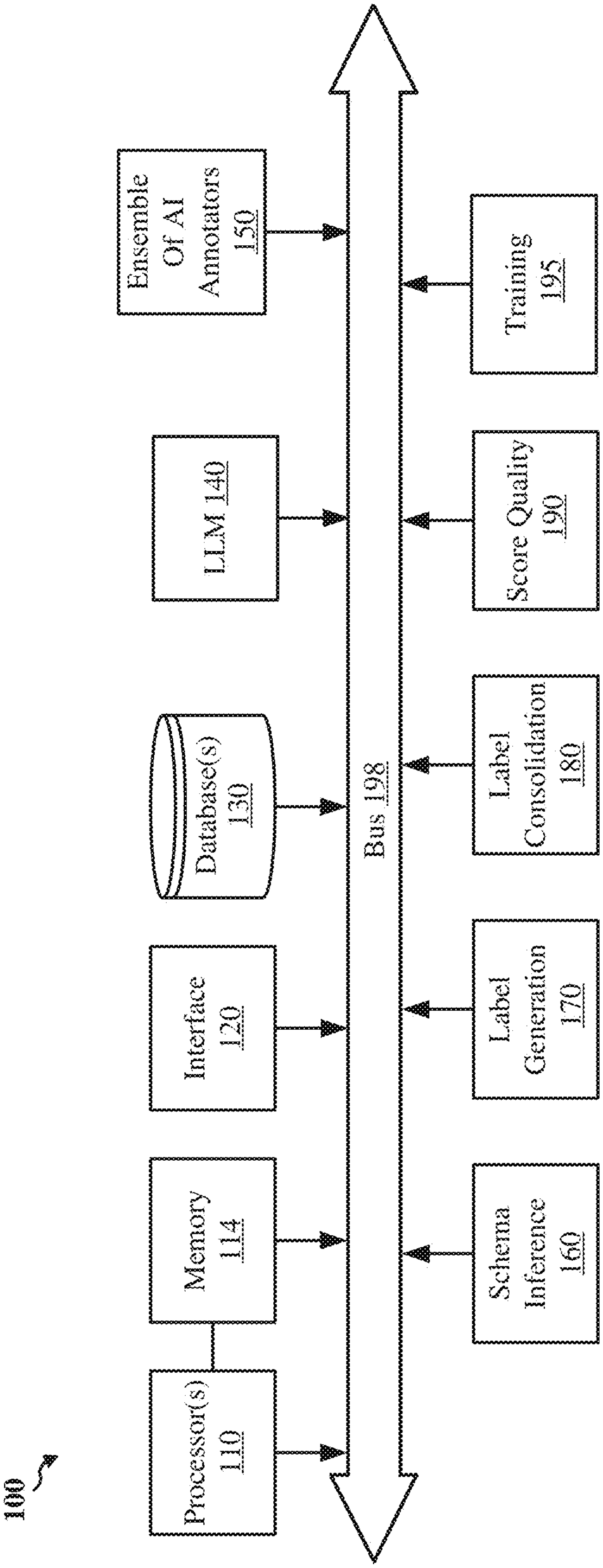
FIG. 1 illustrates a system for generating a labeled extraction dataset for training machine learning models for information extraction tasks, in accordance with some implementations.

Machine learning models used for information extraction tasks for data sources, such as data source understanding for text inputs, visual inputs, audio inputs, code or scientific data inputs, or a combination thereof, typically combine natural language processing (NLP) and computer vision, and use transformers, such as BERT or LayoutLM, that are pre-trained on large datasets. The models are then fine-tuned for specific data source types. The models need to be trained to identify key elements, for example, for documents, the key elements may be headings, paragraphs, or fields ("Name," "Date," "Amount"), and extract relevant data based on patterns for particular data source types. The labeled extraction dataset used to train and test these models include labeled key elements. For example, for documents, labeled key elements may include text annotation, such as identified and tagged specific words or phrases (e.g., dates, names, addresses); layout annotation, such as defined regions like tables, headers, or paragraphs, sometimes with bounding boxes; semantic labeling, such as assigning meaning, e.g., linking "123 Main St" to an "Address" category. The annotations are usually stored in structured formats (e.g., JSON or XML) along with the data source. The key elements in the labeled dataset that are used to train and verify these models must have accurate ground truth labels. The information extraction models learn to extract relevant data based on patterns learned from the extraction dataset during fully supervised training, making it essential to have high-quality training datasets.

Typically, high-quality training datasets for training and verifying machine learning models, such as extraction models, are created by human labelers who manually tag the relevant information in each particular data source. Various techniques are used to ensure the accuracy of the annotations generated, including the use of cross-checking annotations using multiple human labelers, or monitoring performance data associated with the human labelers, such as the time period spent to generate the annotations. The labor-intensive nature of annotation leads to high expense and is prone to human error particularly with information dense, large data sources, such as multi-page documents.

To address limitations of the existing approaches, an ensemble of artificial intelligence (AI) annotators may be used to automate generation of a labeled extraction dataset for training machine learning models for information extraction tasks. The AI annotators, for example, may automate the majority of the label generation, and humans may be used to correct only a small subset of labeled elements with low quality or low confidence scores from the AI annotators. Various machine learning models, such as visual language models (VLMs) and domain specific data source understanding (classic AI and GenAI) models, have been benchmarked and are capable of providing labels with high quality, which can be quantitatively measured at task level. According, as discussed herein a labeled extraction dataset is generated using an ensemble of AI annotation sources to generate labels, combine them, and assign quality scores. Labels that have a poor quality score may be provided to human labelers, thereby shifting the cognitive load for human labelers from entering all the data manually, to reviewing and correcting only a small subset of low quality labelled data elements. Using an ensemble of AI annotators, instead of humans, to create the initial annotations which may be corrected on an as-needed basis, enables a significant, e.g., 10$x$-100$x$, scaleup of the labeled extraction datasets.

FIG. 1 shows a system 100 for generating a labeled extraction dataset for training machine learning models for information extraction tasks, according to some implementations. For the sake of example, but not limitation, the present disclosure sometimes refers to the data source as a document, which may include text or image input data, but it should be understood that the generation of a labeled extraction dataset for training machine learning models for information extraction tasks as discussed herein may be used for any desired type of data source, including text inputs, visual inputs such as image or video inputs, audio or speech inputs, code, scientific or other structured data inputs, etc. Various aspects of the system 100 disclosed herein are generally applicable for labeled document extraction dataset generation for training and verification of machine learning models. The system 100 includes a combination of one or more processors 110, a memory 114 coupled to the one or more processors 110, an interface 120, one or more databases 130, a large language model (LLM) 140, an ensemble of artificial intelligence (AI) annotators 150, a schema inference module 160, label generation module 170, label consolidation module 180, score quality module 190, and training module 195. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device of a user, outputting data (e.g., over the communications network) to the computing device of the user, providing an input interface for the user and outputting results to the computing device of the user, and the like. Specifically, the interface 120 may be used to receive electronic input documents for processing and to provide low quality labels to human labelers for review and correction. For example, the interface 120 may be used to transmit and receive a transmission over the communications network from a computing device associated with human labels. As another example, the interface 120 may be used to transmit one or more results over the communications network to the computing device associated with the user. The interface 120 may also be used to provide or receive other suitable information, such as computer code for updating one or more programs stored on the system 100, internet protocol requests and results, or the like. An example interface includes a wired interface or wireless interface to the internet or other means to communicably coupled with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as data objects, algorithms, weights, models, modules, engines, user information, values, ratios, historical data, recent data, current or real-time data, files, plugins, extracted data and/or metadata, arrays, tags, identifiers, prompts, queries, replies, feedback, insights, formats, characteristics, features, and/or components, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In some implementations, the database 130 includes a relational database capable of presenting information as data sets in tabular form and capable of manipulating the data sets using relational operators. The database 130 may store reference schema associated with known documents, and may be used to store labels, consolidated labels, and a final labeled document extraction dataset.

The LLM 140 may be any suitable large language model, such as a multimodal large language model, a vision language model (VLM), or large vision language model (LVLM) capable of predicting document types and predicted list of fields and data types from an electronic document, as discussed herein. The LLM 140 may be configured to provide reasoning for its predictions. In some implementations, the LLM 140 may be configured to operate as a Judge LLM. The LLM 140 may be pre-trained with vast amounts of domain general multimodal data (e.g., from the internet), utilize artificial neural networks (ANNs) with millions to billions or even trillions of weights or parameters, be trained through self-supervised and/or semi-supervised methods, incorporate one or more aspects of the transformer architecture and/or mixture of experts (MoE), operate in part based on predicting a next token from an input, fine-tuned to perform various natural language processing (NLP) tasks, configured to an process and understand both visual data and textual data together, and include multiple layers of transformer blocks containing overall billions or even trillions of parameters or weights. Example LLMs may include OpenAI's GPT-40, Google's Gemini 1.5 or PaliGemma, Anthropic's Claude 3.5 Sonnet, DeepSeek's DeepSeek-VL2, or another suitable type of ML-based neural network compatible with processing and reasoning across multiple types of data (modalities), including text and images. It should be understood that while LLM 140 is illustrated as coupled to the system 100 via the bus 198, the LLM 140 may be externally located and may be coupled to the remainder of the system 100 via the interface 120.

The ensemble of AI annotators 150 may be a collection of suitable machine learning models, such as a multimodal large language model or large vision language model (LVLM), or machine learning model that extracts key-value pairs features, each of which is capable of classification and data extraction to operate as an annotator to generate labels and associated confidences for fields in an electronic document, as discussed herein. The ensemble of AI annotators 150 includes a plurality, e.g., three or more different machine learning models. In some implementations, different versions (e.g., differing in fine-tuning) of the same machine learning models may be included as different machine learning models within the ensemble of AI annotators 150. In some implementations, LLM 140 may be included in the ensemble of AI annotators 150. The machine learning models within the ensemble of AI annotators 150 may include generative machine learning models, non-generative machine learning models, or a combination thereof. Some machine learning models within the ensemble of AI annotators 150 may be pre-trained with vast amounts of domain general multimodal data (e.g., from the internet), utilize artificial neural networks (ANNs) with millions to billions or even trillions of weights or parameters, be trained through self-supervised and/or semi-supervised methods, incorporate one or more aspects of the transformer architecture and/or mixture of experts (MoE), operate in part based on predicting a next token from an input, fine-tuned to perform various natural language processing (NLP) tasks, configured to an process and understand both visual data and textual data together, and include multiple layers of transformer blocks containing overall billions or even trillions of parameters or weights. Example machine learning models within the ensemble of AI annotators 150 may include OpenAI's GPT-40, Google's Gemini 1.5 or PaliGemma, Anthropic's Claude 3.5 Sonnet, DeepSeek's DeepSeek-VL2, Amazon's Textract, or another suitable type of ML-based neural network compatible with processing and reasoning across multiple types of data (modalities), including text and images. It should be understood that while the ensemble of AI annotators 150 is illustrated as coupled to the system 100 via the bus 198, one or more of the machine learning models within the ensemble of AI annotators 150 may be externally located and may be coupled to the remainder of the system 100 via the interface 120.

The schema inference module 160 may be configured to generate one or more prompts to obtain a schema associated with an electronic input document from the LLM 140. The schema inference module 160 may be configured, for example, to generate a zero shot classification prompt for an input document that is submitted to the LLM 140. The schema inference module 160 may be further configured, for example, to incorporate a response from the LLM 140 to the zero shot classification prompt and to generate a zero shot schema inference prompt for the input document that incorporates at least a portion of the response from the LLM 140 to the zero shot classification prompt and that is submitted to the LLM 140 to obtain a schema for the electronic input document.

The label generation module 170 may be configured to generate one or more structured inputs or prompts to obtain labels and associated confidences for fields in an electronic input document from each machine learning model in the ensemble of AI annotators 150. The label generation module 170 may be configured, for example, to generate one or more structured inputs or prompts that includes the electronic input document and an associated schema, e.g., which is obtained from the database 130 as a reference schema or obtained by the schema inference module 160. The label generation module 170, for example, may be configured to generate different structured inputs or prompts for different types of machine learning models in the ensemble of AI annotators 150, e.g., for generative machine learning models and non-generative machine learning models, that will result in responses including labels and associated confidences for fields in the electronic input document that is in the same format. The label generation module 170 may be further configured to submit the one or more structured inputs or prompts to the machine learning models in the ensemble of AI annotators 150 to obtain a label and associated confidence for each field in the electronic input document from each machine learning model in the ensemble of AI annotators 150.

The label consolidation module 180 may be configured to consolidate the labels and associated normalized and calibrated confidence scores for each field in the electronic input document from each machine learning model in the ensemble of AI annotators 150 into a single label and associated normalized confidence score for each field in the electronic input document. To combine the confidence scores across different AI annotators, a small amount of reference labelled dataset can be used to normalize and calibrate the raw confidence scores from each AI annotator. The label consolidation module 180, for example, may be configured to consolidate the labels and associated confidence scores based on a majority method, an LLM-as-Judge method, a Bayesian inference method, a combination thereof, or any other desired consolidation method.

The score quality module 190 may be configured to generate a score for the consolidated labels generated using the label consolidation module 180 and to identify high quality and low quality labels based on the score. The score quality module 190, for example, may be configured to generate quality scores and identify high quality and low quality labels based on a percentage of all-annotator-agreement method, a Bayesian inference method, a confidence score method, a combination thereof, or any other desired consolidation method based on use cases. The quality score for each label, for example, may be compared to a predetermined threshold to identify high quality (e.g., quality score greater than a threshold) and low quality labels (e.g., quality score less than a threshold). Additionally, the score quality module 190 may normalize and calibrate the confidence scores. The score quality module 190 may be further configured to route high quality labels to be stored in the final labeled document extraction dataset, e.g., in the database 130. The score quality module 190 may be further configured to route low quality labels for further review and correction, e.g., by repeating the processing with altered prompts or different annotators or to human labels, and the corrected labels are stored in the final labeled document extraction dataset, e.g., in the database 130.

The training module 195 may be configured to train a machine learning model for information extraction tasks, such as document understanding, using the final labeled document extraction dataset stored in database 130. The machine learning model may be an LLM, such as LLM 140, and is pre-trained on large datasets or a more compact, low latency variant of LLM 140. The training module 195 may use the final labeled document extraction dataset to fine tune the machine learning model. For example, the training module 195 may split the final labeled document extraction dataset into training, validation, and test sets. The training module 195 may be configured to feed the model document data (input) and the corresponding high quality labels (output) during training, and the model's internal parameters (e.g., weights in a neural network) are adjusted to minimize the difference between its predictions and the labels from the training subset of the final high quality labeled document extraction dataset. The training module 195 may be configured to use the validation subset from the final high quality labeled document extraction dataset to fine-tune hyperparameters and prevent overfitting. The training module 195 may be further configured to evaluate or test the performance of the machine learning model on how well it extracts labeled information from unseen data using the test subset from the final high quality labeled document extraction dataset. The training module 195 may be further configured to deploy the machine learning model for information extraction tasks once training is completed and to retrain the model, e.g., with additional labeled data in the final labeled document extraction dataset, as needed.

The schema inference module 160, label generation module 170, label consolidation module 180, score quality module 190, and training module 195, as well as other components of the system including the LLM 140 and ensemble of AI annotators 150, are implemented in software, hardware, or a combination thereof. In some implementations, any one or more of the schema inference module 160, label generation module 170, label consolidation module 180, score quality module 190, and training module 195 is embodied in instructions that, when executed by the processor 110, cause the system 100 to perform the operations. In various implementations, the instructions of one or more of the components, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to labeled document extraction dataset generation for training and verification of machine learning models are described with reference to the system 100, other suitable system configurations may be used.

Figure 2:
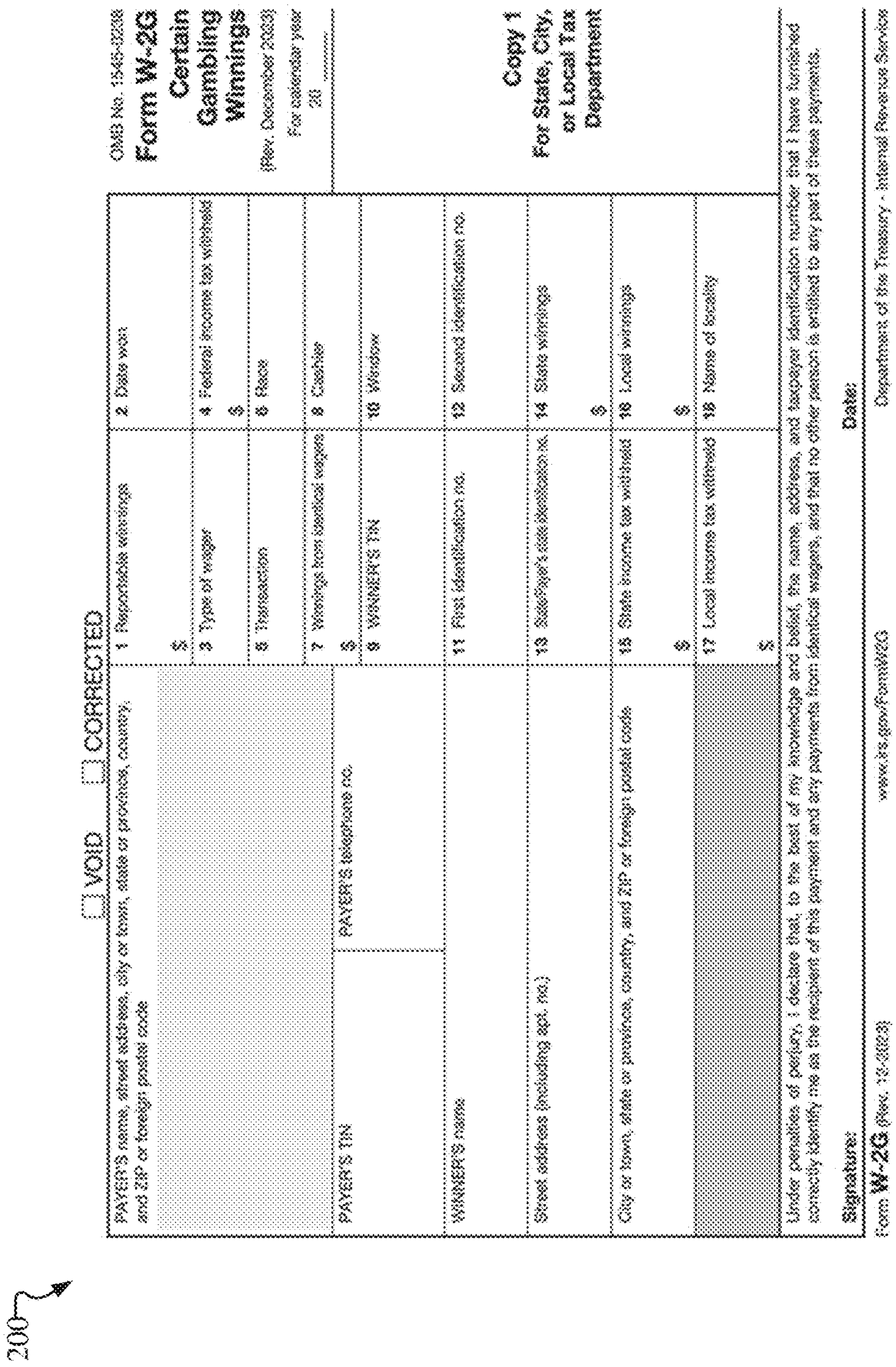
FIG. 2 shows an illustrative form that may be processed for generating a labeled extraction dataset for training machine learning models.

FIG. 2, by way of example, shows an illustrative form 200, which is a W-2G form, which may be processed to generate a labeled document extraction dataset for training machine learning models such as a document understanding model.

In general, machine learning models, such as document understanding models, attempt to extract key information from electronic documents including but not limited to text files, PDFs or image captures of the document in natural settings or scanned documents from an electronic scanner. Document understanding models interpret and analyze the content, structure, and key elements of documents using several main tasks, including classification, schema inference, and information extraction. Classification, for example, involves determining the category or type of a document (e.g., form 200 may be categorized as a W-2G form) based on its content and features from an entire document. Schema inference determines the underlying structure or organization of a document, such as identifying that a document has particular fields, e.g., by analyzing patterns. For example, various fields may be identified in form 200, such as "PAYER's name, street address, city or town, state or province, country, and ZIP or foreign postal code," "Reportable winnings in box 1, "Date won" in box 2, etc. Extraction is used to pull out specific pieces of information from a document, such as names, dates, or numbers, e.g., "Jane A DOE" from field e, and "48,500.00" in field 1, present them in a structured format, and make the structured formatted extraction data available for critical downstream tasks such as electronic tax filing or accounting book keeping.

Figure 3:
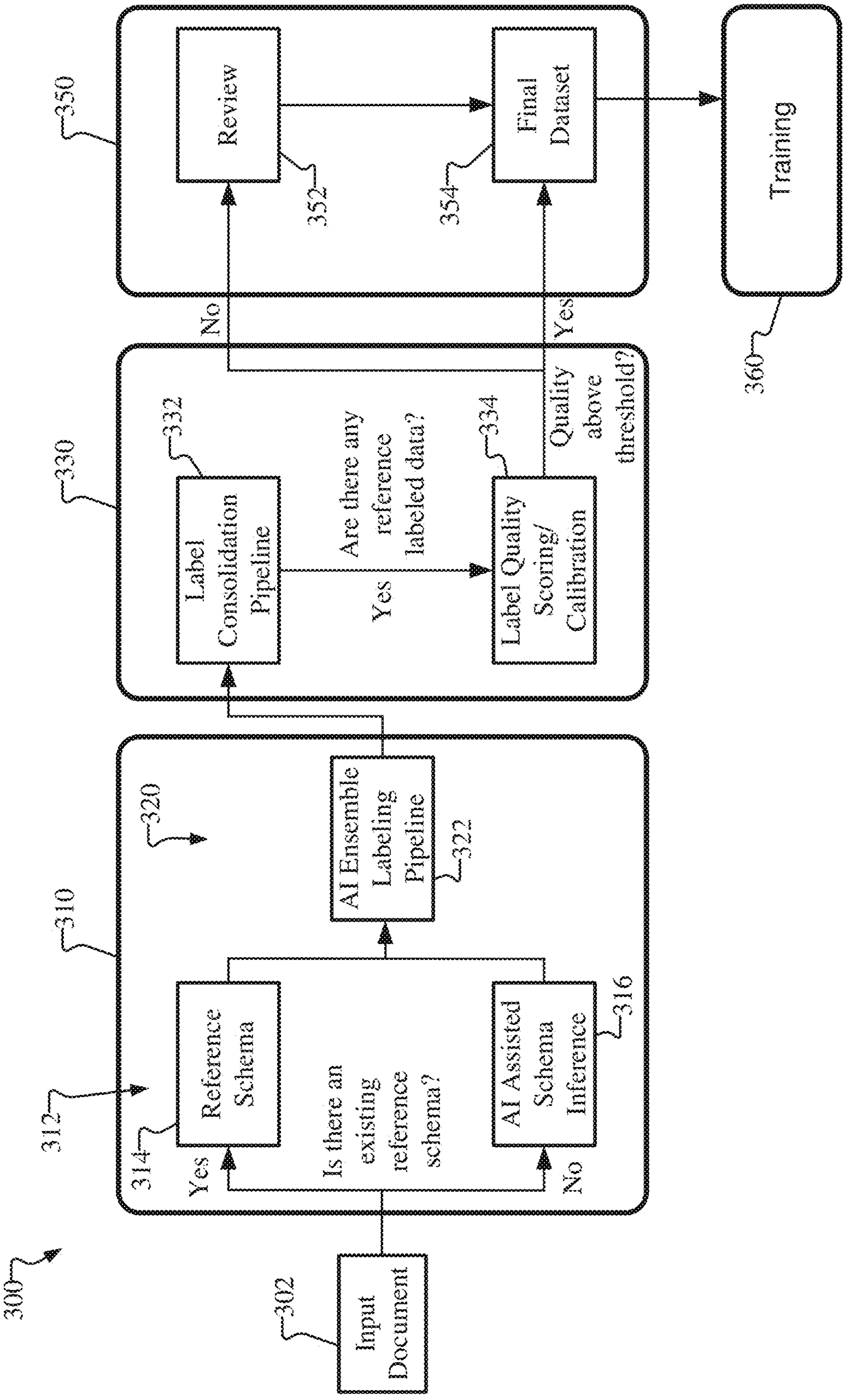
FIG. 3 illustrates an example architecture configured for generation of a labeled extraction dataset for training machine learning models for information extraction tasks, in accordance with some implementations.

FIG. 3 illustrates an example architecture 300 configured for generation of a labeled document extraction dataset for training machine learning models for information extraction tasks. The architecture 300 for generation of a labeled document extraction dataset includes several combined processes. As illustrated, the architecture 300 includes an AI ensemble label generation process 310, a model agnostic label consolidation and scoring process 330, and a final review process 350.

The AI ensemble label generation process 310 may include two sub-processes, in which a schema associated with an input document 302 is obtained in a first process 312 and an ensemble of machine learning model annotators is used to generate labels for each field (data element) in the input document 302 based on the schema in a second process 320. Uncalibrated confidence scores for the generated labels may also be generated by the ensemble of AI annotators in the second process 320.

The label consolidation and quality scoring process 330 receives the plurality of labels and uncalibrated confidence scores for each field (data element) produced by the plurality of annotators used in the AI assisted label generation process 310. The label consolidation and quality scoring process 330 may involve two separate or interrelated actions, label consolidation and quality scoring and calibration. As illustrated, the label consolidation is performed by a label consolidation pipeline 332 that receives the output from the AI assisted label generation process 310, which includes multiple labels and corresponding confidence scores for each field (data element), and produces a single label and associated confidence score per field (data element). The quality scoring and calibration is performed by a label quality scoring/calibration unit 334, which determines the quality of the labels, e.g., based on the confidence scores, and forwards the labels to the final review process 350, e.g., low-quality labels are routed for further review and high-quality labels are routed for storage in the final dataset.

The final review process 350 receives the labels, which may be identified as low quality or high quality, from the label consolidation and quality scoring process 330. The low-quality labels are routed for further review 352, e.g., by human labels or re-processing. The high-quality labels from the label consolidation and quality scoring process 330 and the verified or corrected labels from the review 352 are routed for storage in the final dataset 354, which serves as the high quality labeled document extraction dataset. The final dataset 354 may then be used for training 360 machine learning models for information extraction tasks.

With respect to the AI assisted label generation process 310 illustrated in FIG. 3, an input document 302 is provided, and in the first process 312, schema associated with the input document 302 is obtained. If the input document 302 type is known, a reference schema for the input document 302 type may already exist and may be obtained from a reference schema source 314. On the other hand, in some implementations, the input document 302 type may not be known to the system or reference schema may not exist, and accordingly, the important pieces of information for the input document 302 type are unknown. Accordingly, if a reference schema for the input document 302 does not exist, the schema may be obtained via machine learning assisted schema inference 316. For example, a schema inference prompt for a multimodal LLM may be used to obtain a list of key information entities, such as key name (title), page number, data type, and explanation (reason).

Figure 4:
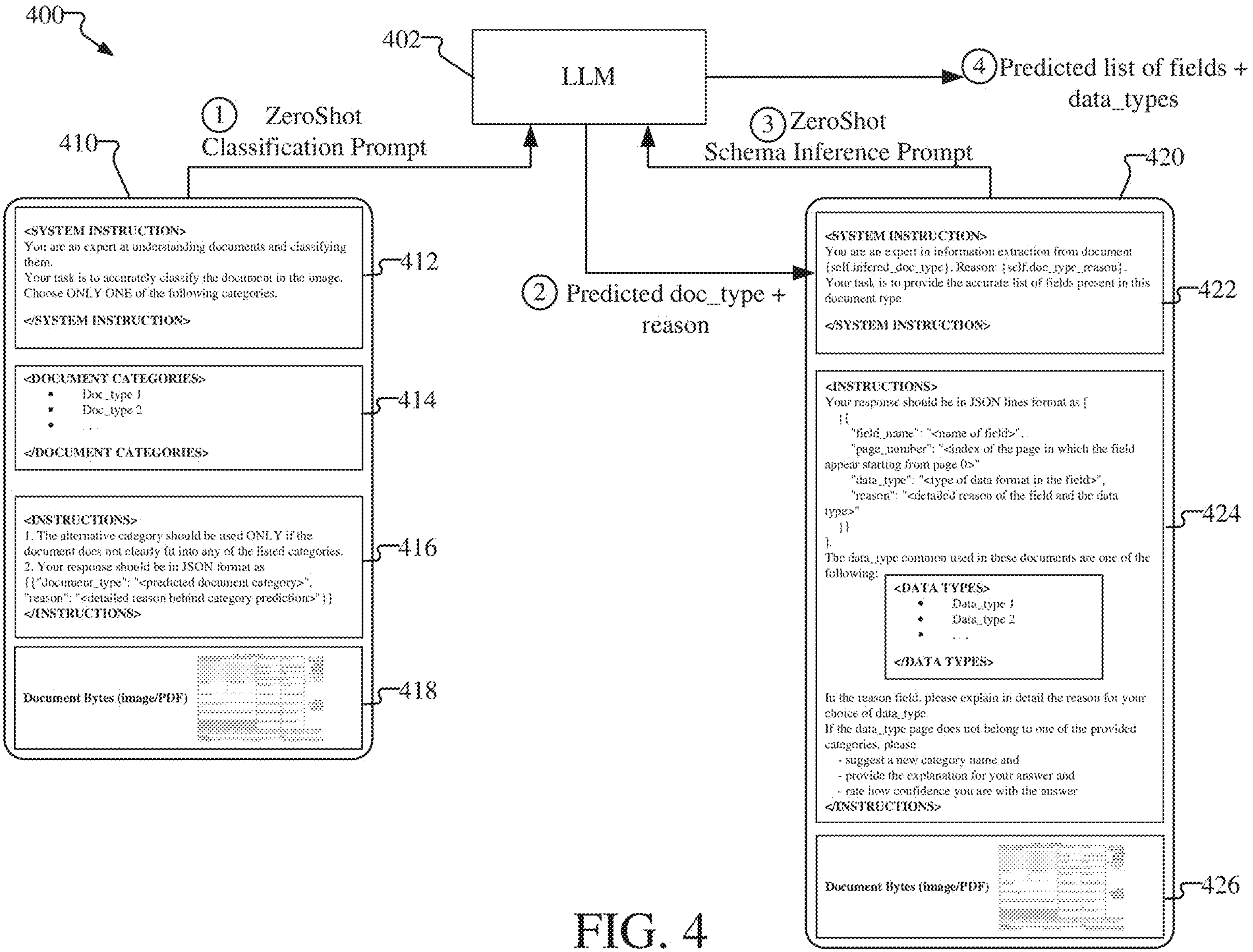
FIG. 4 illustrates a schema inference process that may be used to obtain a schema associated with an unknown input data source, in accordance with some implementations.

FIG. 4, by way of example, illustrates a schema inference process 400 that may be used to obtain a schema associated with an unknown input document, in accordance with some implementations. The schema inference process 400 may be used as the machine learning assisted schema inference 316 illustrated in FIG. 3 in some implementations.

As illustrated, in a first (1) step, a zero-shot classification prompt 410 is submitted to a large language model (LLM) 402, which may be a multimodal LLM, such as Gemini-1.5 Pro. The LLM 402, for example, may be a pre-existing model that has not been fine-turned with examples tailored for the task. In some implementations, the LLM 402 may be the LLM 140, shown in FIG. 1.

The classification prompt 410 may include system instructions 412, document categories 414, instructions for responding 416, and the electronic document 418. The system instructions 412, for example, may provide a high-level guideline that sets the tone or role for the LLM 402, such as, "you are an expert at understanding documents and classifying them." The prompt may include document categories, which may be a list of document types that are expected to be seen. The instructions for responding 416 may be more specific instructions directing the LLM 402 how to respond, e.g., the format of the response and information that should be included in the response, such as document type and detailed reason behind category prediction. The electronic document 418 is a copy of the electronic document for which the document class is to be determined, which in this example, may be the form 200 shown in FIG. 2.

The LLM 402 processes the classification prompt 410 including the input document and at a second (2) step, provides a response that includes the predicted document type and may include the reasoning for predicting the document type. The predicted document type and reasoning are included in a schema inference prompt 420, which in a third (3) step may be submitted to the LLM 402 as a zero-shot schema inference prompt.

The schema inference prompt 420, for example, may include system instructions 422, instructions for responding 424, and the electronic document 426. The system instructions 422, for example, may provide a high-level guideline that sets the tone or role for the LLM 402, such as, "you are an expert in information extraction {infered_doc_type}. Reason: {doc_type_reason}. Your task is to provide an accurate list of fields present in this document type." The system instructions 422, for example, may include the predicted document type and reasoning provided by the LLM 402 in the second (2) step, e.g., as the "{infered_doc_type}" and "{doc_type_reason}." The instructions for responding 424 may be more specific instructions directing the LLM 402 how to respond, e.g., with the specific format such as JSON, and the information that should be included in the response, such as data type and detailed reason behind the data type. The electronic document 426 is a copy of the electronic document that was included in the classification prompt 410, e.g., in this example form 200 shown in FIG. 2.

The LLM 402 processes the zero-shot schema inference prompt 420 including the input document and at a fourth (4) step, provides a response in the requested format that includes the predicted list of fields and data types, and may include the reasoning for predicting the fields and data types.

FIG. 5 illustrates, as an example, the zero-shot schema inference results 500 from FIG. 4 that the LLM 402 may produce in response to the schema inference prompt 420 related to form 200 from FIG. 2. The schema inference results 500 are shown in table format including field_name, page_number, data_type, and reason for the sake of illustratation. It should be understood, however, that the schema inference results 500 may be provided in the specifically requested format, e.g., JSON lines format, or other requested format.

Additionally, with respect to the AI ensemble label generation process 310 illustrated in FIG. 3, the second process 320 uses an ensemble of machine learning model annotators to generate labels and associated confidence scores for each field (data element) in the input document 302 based on the schema obtained in the first process 312. An AI ensemble labeling pipeline 322, for example, may be used to construct a document type specific prompt for labeling based on the schema, and to provide the prompt to an ensemble of machine learning model annotators for producing labels and associated confidence scores for each field. The ensemble of machine learning model annotators may include various machine learning models, which may include Generative AI models, classic AI (i.e., non-Generative AI) models, and multimodal LLM (MLLMs), such as large Vision-Language Models (LVLMs), etc.

Figure 6:
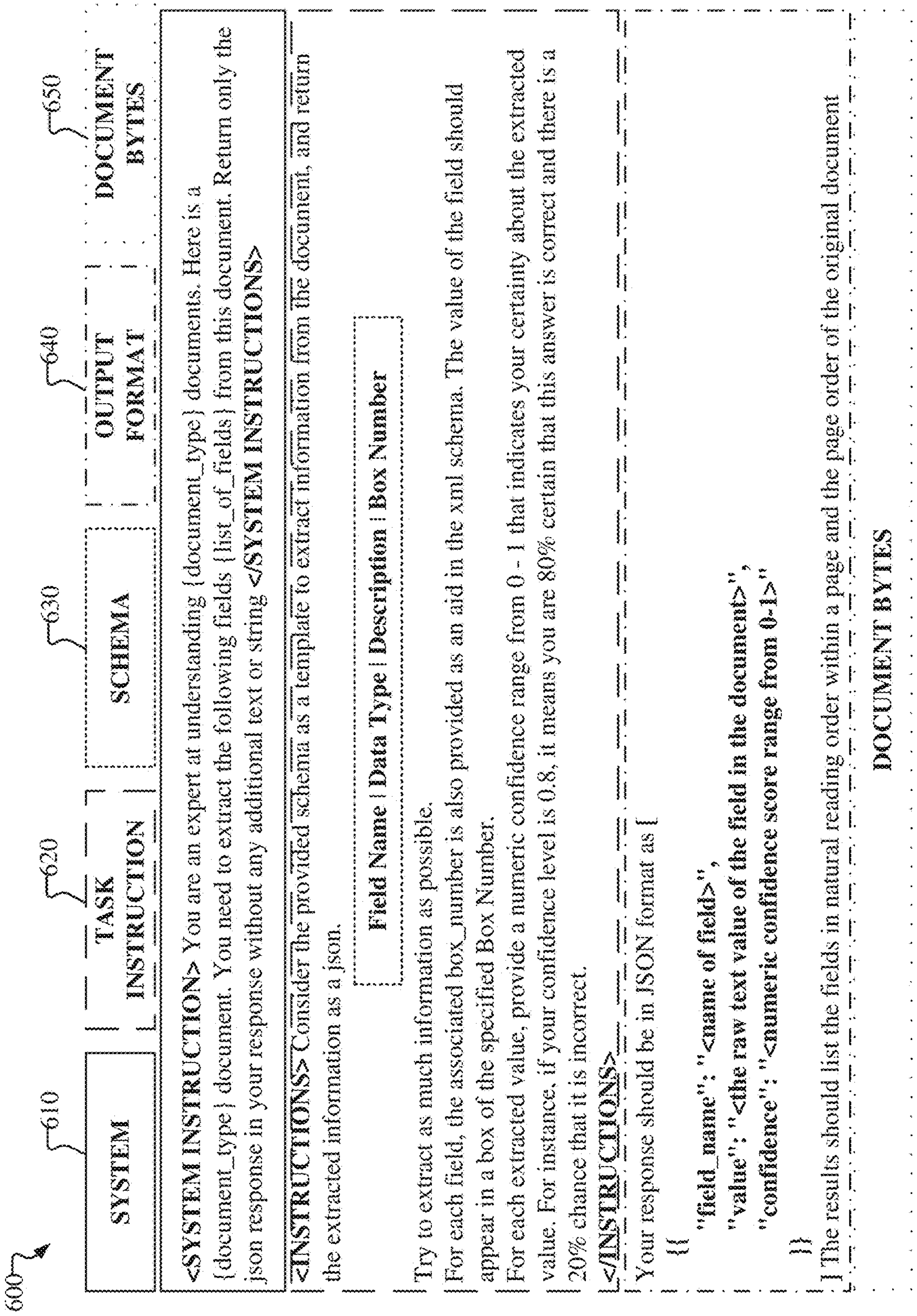
FIG. 6 illustrates an extraction labeling prompt template that may be used to construct a document type specific prompt based on a schema associated with the input data source, in accordance with some implementations.

FIG. 6, by way of example, illustrates an extraction labeling prompt template 600 that may be used to construct a document type specific prompt based on a schema associated with the input document. The extraction labeling prompt template 600, for example, may be used with Generative AI based machine learning models. An extraction labeling prompt generated based on the template 600 may be provided to the ensemble of machine learning model annotators for labeling an input document.

As illustrated, the extraction labeling prompt template 600 may include system instruction 610, task instructions 620, schema 630, output format instruction 640, and the electronic document 650. The system instruction 610, for example, may provide a high-level guideline that sets the tone or role for the ensemble of machine learning model annotators, such as "You are an expert at understanding {document_type} document . . . extract the following fields {list_of_fields} from this document. Return only the json response in your response without any additional text or string." The task instructions 620 may include the obtained schema 630 that is associated with the input document and instructions to extract values for each field. The task instructions 620, for example, may include instructions to provide associated confidence scores for each extracted value. The output format instruction 640 provides instructions related to how the response should be formatted and the information provided. The electronic document 650 is a copy of the electronic input document from which the labels for the data elements are to be extracted.

As noted above, the extraction labeling prompt template 600 may be used with Generative AI based machine learning models. For classic AI, i.e., non-Generative AI, based machine learning models, the schema may be used to associate the value to the schema key names using title as the reference.

Once an extraction labeling prompt is constructed, e.g., based on the template 600 shown in FIG. 6, the formatted prompt with the document is submitted to an ensemble of machine learning model annotators for labeling and providing associated confidence scores as part of the AI ensemble labeling pipeline 322 of FIG. 3. The ensemble of machine learning model annotators, for example, may include Generative AI models, classic AI (i.e., non-Generative AI) models, or a combination thereof.

Figure 7:
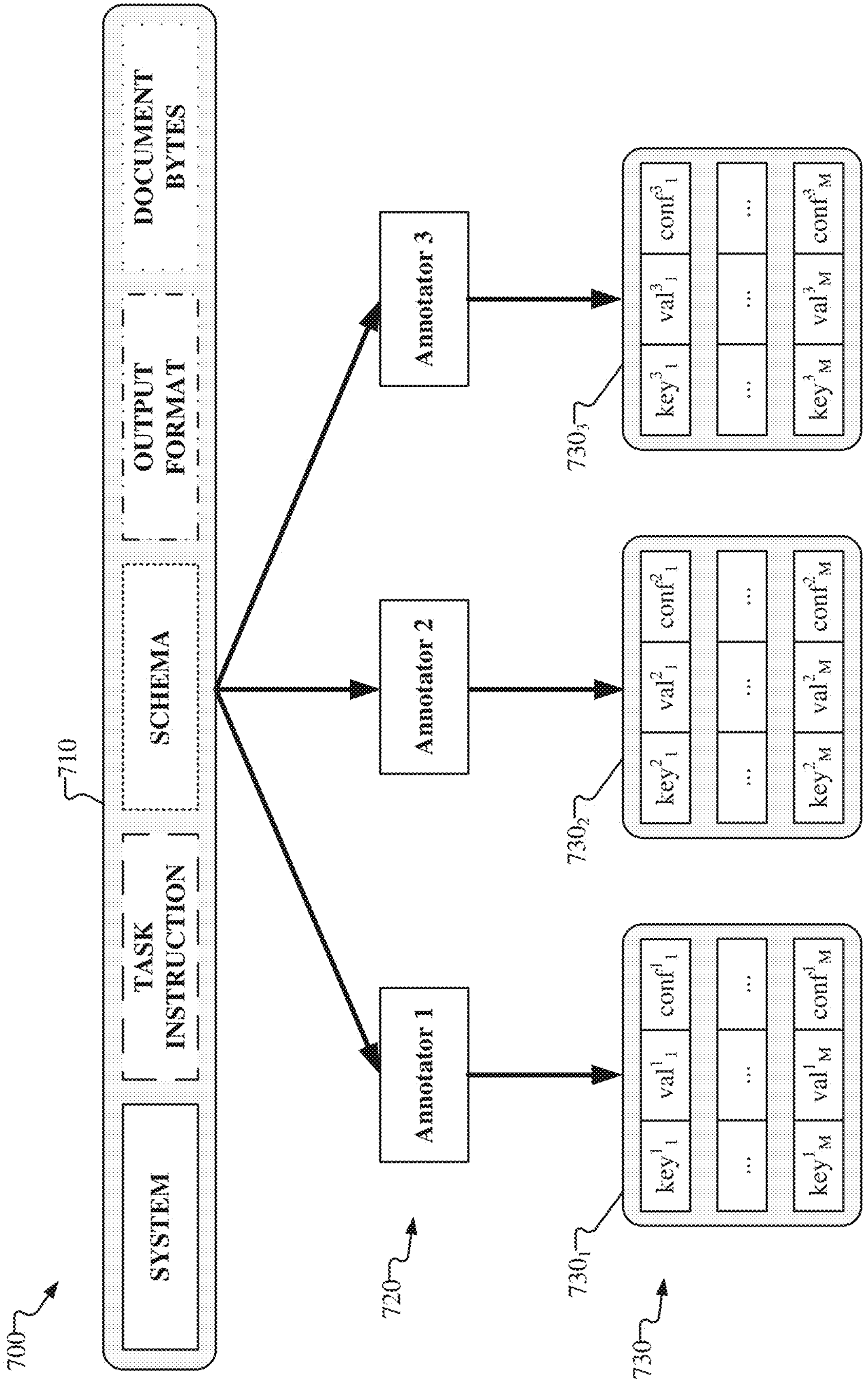
FIG. 7 illustrates a system in which an extraction labeling prompt is submitted to an ensemble of machine learning model annotators to generate a plurality of labels for each field, in accordance with some implementations.

FIG. 7, by way of example, illustrates a system 700 in which an extraction labeling prompt template 710 is submitted to an ensemble of machine learning model annotators 720, illustrated as annotator 1, annotator 2, and annotator 3, which may be the ensemble of AI annotators 150 shown in FIG. 1. The machine learning model annotators 720 may be Generative AI models and may include multimodal LLM (MLLMs), such as Vision-Language Models (VLMs). The system 700 may be used in the AI ensemble labeling pipeline 322 illustrated in FIG. 3 in some implementations. The ensemble of machine learning model annotators 720, for example, may be the ensemble of AI annotators 150, shown in FIG. 1. It should be understood that while the three machine learning model annotators are illustrated in the ensemble of machine learning model annotators 720, additional or fewer machine learning model annotators may be used.

As illustrated, the prompt template 710, which may have the format of the extraction labeling prompt template 600 illustrated in FIG. 6, is separately provided to each of the machine learning model annotators 720. Each of the machine learning model annotators annotator 1, annotator 2, and annotator 3 produces independent responses 7301, 7302, and 7303, sometimes collectively referred to as responses 730, to the prompt that includes labels for the input document based on the schema provided. As illustrated, for each annotator i, and field j, the responses 730 may include a $key^i_j$ corresponding to the field name, $val^i_j$ corresponding to the label or raw text value of the field in the input document, and $conf^i_j$ corresponding to the confidence associated with the value, which may be a numeric confidence score range from 0-1.

Figure 8:
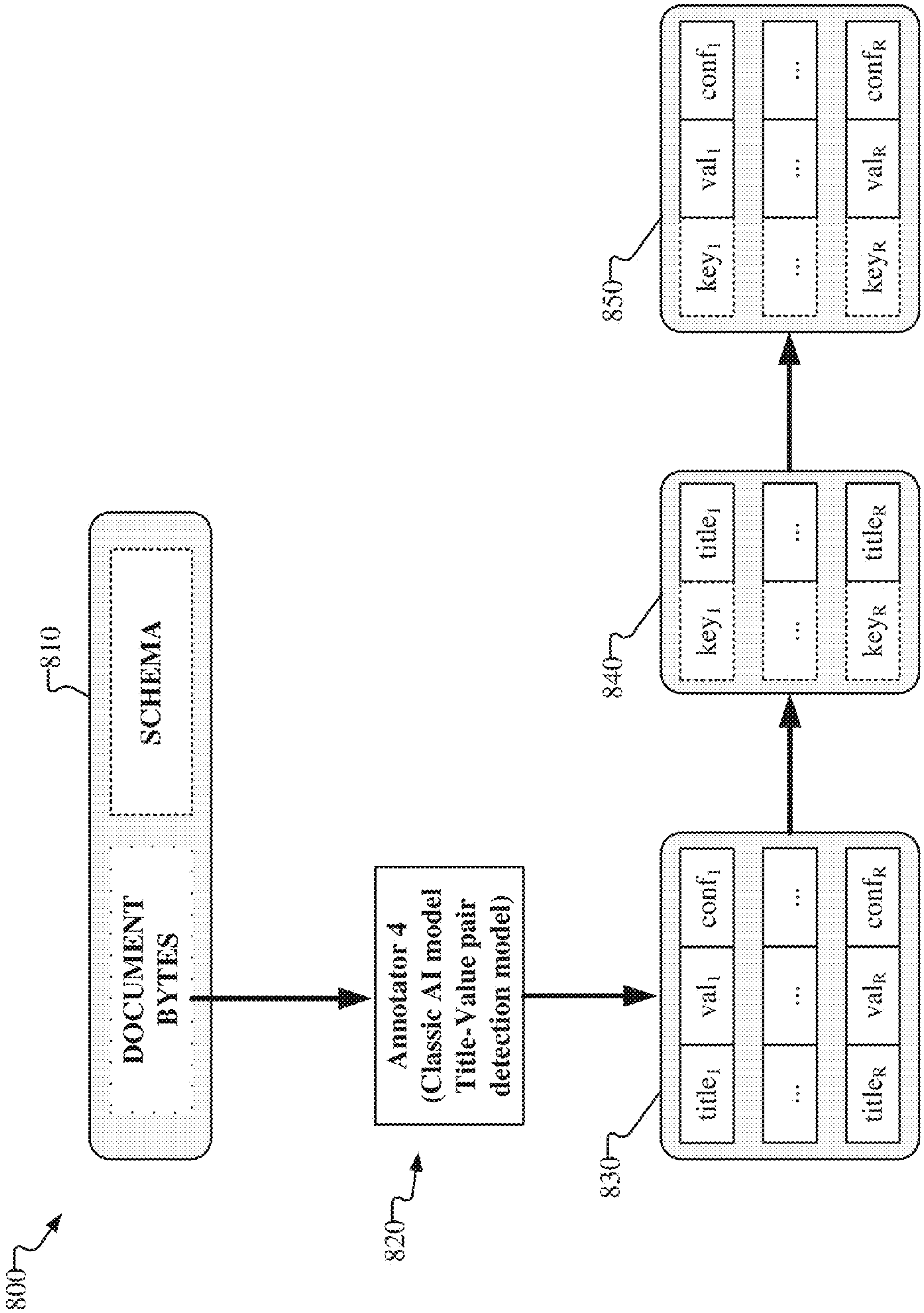
FIG. 8 illustrates a system in which an extraction labeling prompt is submitted to another machine learning model annotator to generate a plurality of labels for each field, in accordance with some implementations.

FIG. 8, by way of example, illustrates a system 800 in which an extraction labeling prompt 810 is submitted to a machine learning model annotator 820, illustrated as annotator 4, which may be part of an ensemble of machine learning model annotators, such as the ensemble of AI annotators 150 shown in FIG. 1. The annotator 4 may be a classic AI (non-Generative AI) model, such as Amazon's Textract. The annotator 4 may be combined with other classic AI models or may be combined with the ensemble of machine learning model annotators 720 shown in FIG. 7.

The prompt 810 used with the classic AI model annotator 4, may be simplified with respect to the prompt template 710 shown in FIG. 7, and may include the schema and a copy of the input document from which the labels for the data elements are to be extracted. As illustrated, the annotator 4 may determine a response 830 that uses a title as opposed to the key name. As shown by box 840, the structured input or prompt may instruct the annotator 4 to associate the value to the schema key names using title as the reference, to produce the response 850, including for each field j, the $key_j$ corresponding to the field name, $val_j$ corresponding to the label or raw text value of the field in the input document, and $conf_j$ corresponding to the confidence associated with the value, which may be a numeric confidence score range from 0-1.

With respect to the label consolidation and quality scoring process 330 illustrated in FIG. 3, the responses from the ensemble of machine learning model annotators, including a plurality of labels and confidence scores for each field (data element) from the AI ensemble label generation process 310, are received and two separate or interrelated actions are performed to consolidate the labels and perform quality scoring and calibration.

Figure 9:
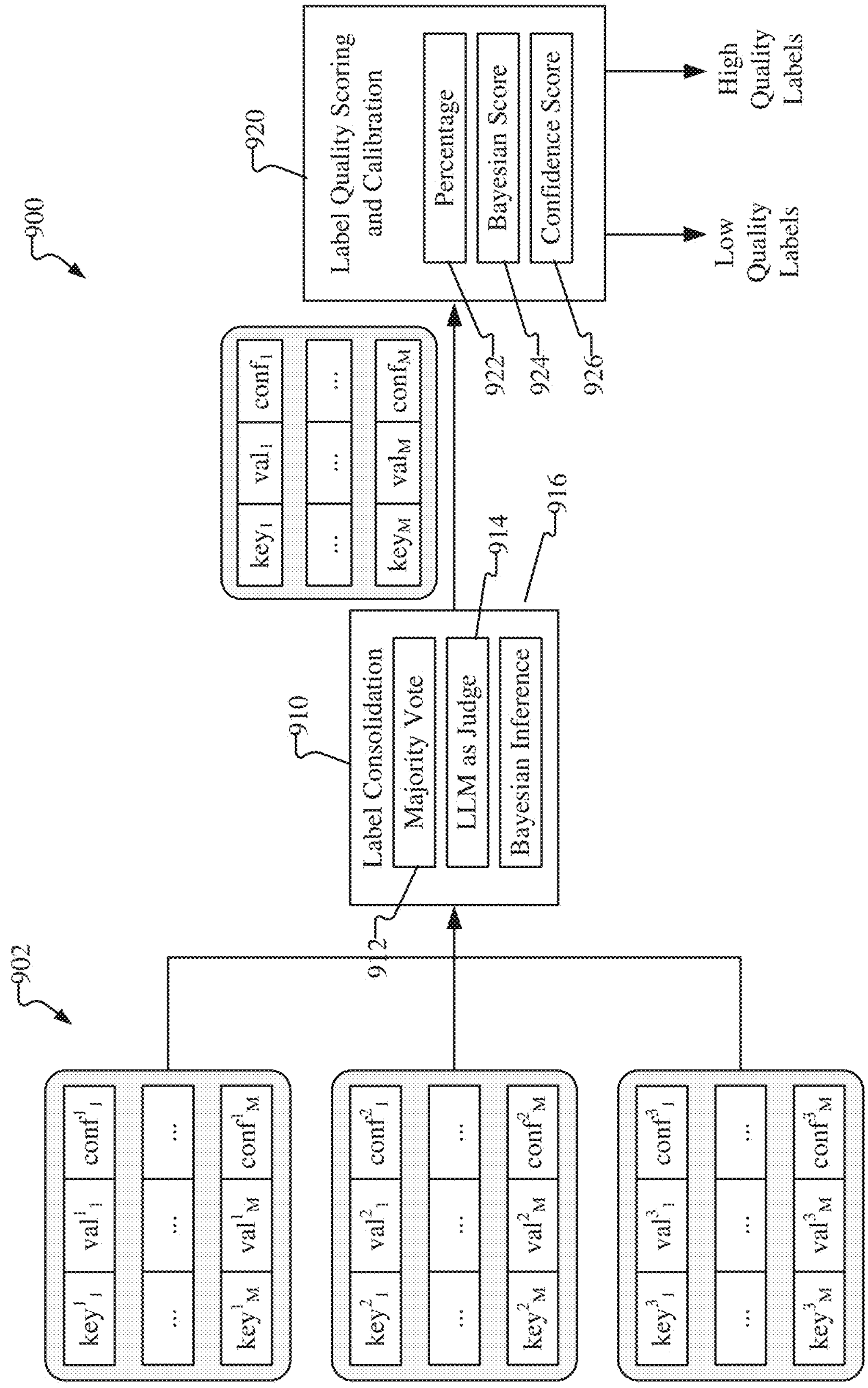
FIG. 9 illustrates a label consolidation and quality scoring system, in accordance with some implementations.

FIG. 9, by way of example, illustrates a label consolidation and quality scoring system 900, which includes a label consolidation pipeline 910 and a label quality scoring and calibration pipeline 920. The label consolidation and quality scoring system 900, for example, may be used for the label consolidation and quality scoring process 330 illustrated in FIG. 3, with the label consolidation pipeline 910 and the label quality scoring and calibration pipeline 920 serving as the label consolidation pipeline 332 and the label quality scoring/calibration unit 334, in some implementations.

As illustrated in FIG. 9, the label consolidation pipeline 910 receives the label and confidence score output 902 from each machine learning model annotator. For example, the label and confidence score output 902 may be the responses 730 and/or 850 shown in FIGS. 7 and 8. The label and confidence score output 902 includes multiple labels and corresponding confidence scores for each field (data element). Thus, the label consolidation pipeline 910 receives multiple labels and corresponding confidence scores for each field (data element) and produces a single label and associated confidence score per field (data element). The label consolidation may be annotator agnostic, i.e., the label consolidation pipeline 910 may not consider the type of machine learning model annotator that generated the labels and associated confidence scores during consolidation.

The label consolidation pipeline 910 may use several different label consolidation methods, each of which combines labels from multiple sources and attempts to improve the overall quality of the consolidated labels compared to that of individual labeling annotators. In some implementations, the label consolidation may be performed for extraction at a key-level, and accordingly, reference to the term "entity" in the following discussion refers to an individual key/item in an input document.

In one implementation, the label consolidation pipeline 910 may use a majority or consensus vote 912. For example, consider n labels are available from n different annotators for a given entity (key/item). The majority vote may identify the unique label value that are common among the largest subset of annotators for each data element, and that label value is selected as the final consolidated value for the given entity. If no such majority is established, the output of a default chosen annotator (e.g., an annotator that historically has the best overall performance for a specific data element type) may be selected as the final consolidated value for the given entity, or another label consolidation method may be performed. In some implementations, a simple majority (more than half) may be used, while in other implementations a different threshold, e.g., lower or higher, may be used, such as ⅔n, ¾n, etc., while in other implementations, a qualified majority or weighting of the labels, e.g., based on annotator type, may be used.

In another implementation, the label consolidation pipeline 910 may use an LLM-As-a-Judge 914. The use of LLM-As-a-Judge as a consolidation method, for example, may include two sub-stages. In the first stage, high quality labels are identified. For example, consider n labels are available from n different annotators for a given entity (key/item). For any entities for which all annotators agree, the label values are selected as the final consolidated values for these entities. In the second stage, for the remaining entities, e.g., where at least one annotator disagrees, the entities may be provided to a Judge LLM, e.g., LLM 140 shown in FIG. 1. Specifically, the Judge LLM may be prompted with field level queries for the entity from the input document, along with available label values provided by the different annotators. The Judge LLM may be allowed to generate a new response, i.e., label value, if the correct answer is not among the available label values provided. Finally, the labels for the entities identified in the first stage are combined with the responses from Judge LLM in the second stage are combined to obtain the final consolidated label set for the input document. In some implementations, the Judge LLM may be the superior LLM and is not used as one of the annotators in the first stage.

In another implementation, the label consolidation pipeline 910 may use Bayesian inference 916. Unlike the aforementioned two label consolidation methods, Bayesian inference introduces a notion of "annotator reliability" which measures the accuracy of different AI annotators to annotate different labeling tasks at the field type level. The annotator's reliability is determined by pre-computing the annotator's label accuracy for each specific field using a small amount of labelled dataset (containing input document and ground truth). For each unique label value, the Bayesian inference method computes the posterior probability of the true label being a particular observed unique label value.

For example, for the Bayesian inference 916 for consolidation, for each extraction field, there may be k annotators out of A total annotators that produce label l with the corresponding (calibrated) confidence scores c, such that:

$$\mathcal{L}=\{(l_i,c_i)\};1\le i\le k,k\le A. \quad \text{eq. 1}$$

These labels correspond to m unique label values, such that:

$$\mathcal{V}=\{v_j\};1\le j\le m,m\le k. \quad \text{eq. 2}$$

For each label value in $\mathcal{V}$, there might be one or more labels and associated one or more confidence scores. The label set can be partitioned into subsets based on the label value as:

$$\mathcal{V}=\{\{v_1,l_i=v_1,c_i,p_i\}, \ldots ,\{v_1,l_i=v_m,c_i,p_i\}\}. \quad \text{eq. 3}$$

Let $n_j$ be the cardinality of the subset of labels where label value is equal to $v_j$ (e.g., the number of annotators that generate label value $v_j$) such that:

$$\sum_{j-1}^{m} n_j = k. \quad \text{eq. 4}$$

Equation 4 indicates that the total number of labels generated is the sum of the number of labels in all of the subset. Given the setup above, the likelihood that the true label being $v_j$ may be computed as:

$$P(v_i) = \frac{\prod_{q\in n_i} c_q p_q \prod_{r\notin n_i} c_r(1-p_r)}{\sum_{j=1}^{m} \prod_{q\in n_j} c_q p_q \prod_{r\notin n_j} c_r(1-p_r)}. \quad \text{eq. 5}$$

The above likelihood is computed for each unique label value $v_j$ in $\mathcal{V}$. The posterior probability is the likelihood for each $v_j$ normalized by the sum of the likelihood of all the labels values in $\mathcal{V}$. The label with the highest posterior probability is returned as the final consolidated label. The posterior probability may be performed independently on each field in a document and can be generalized to an arbitrary number of AI annotators.

In some implementations, a combination of two or more of the above consolidation methods may be used for label consolidation. Additionally, in some implementations, different consolidation methods may be used if desired.

The label consolidation pipeline 910 produces a single label and associated confidence score per field (data element), which is provided to the scoring and calibration pipeline 920 which determines the quality of the labels, e.g., by determining a metric for the quality of the labels and comparing the metric to a predetermined threshold to determine if the label is low quality or high quality. The scoring and calibration pipeline 920, for example, is used to identify low quality labels, which may be routed for further review, e.g., by human labels, in order to improve the overall quality of the labels. The threshold may be adjusted as desired based on the desired quality of the labels and amount of review by human labels. The scoring and calibration pipeline 920 may use several different scoring methods.

In one implementation, an all annotator agreement percentage 922 may be used to identify low quality labels. For example, the percentage for labels with all annotators that agree with a final consolidated label may be compared to a predetermined threshold to determine if the final consolidated label is low or high quality. In one implementation, for example, 100% agreement of all aggregators may be required and no comparison to a predetermined threshold is necessary. Thus, the final consolidated label may be retained for all entities where all AI annotators agree, and any entities with at least one disagreement amongst the AI annotators are routed for further review. In some implementations, a percentage of agreement may be used, such as 90%, 75%, etc.

In one implementation, a Bayesian score 924 may be used to identify low quality labels. For example, the posterior probability computed during label consolidation using Bayesian inference 916 may be used directly as the quality score. The posterior probability may be compared to a predetermined threshold to determine if the final consolidated label is low or high quality.

In one implementation, a confidence score 926 may be used to identify low quality labels. For example, the verbalized confidence scores associated with each label may be compared to a predetermined threshold to determine if the final consolidated label is low or high quality. The verbalized confidence scores, however, may not be well-calibrated. In order to identify low quality labels with higher accuracy, calibration of the verbalized confidence scores may be performed, e.g., with the assistance of a small labeled dataset. For example, known calibration methods, such as Platt Scaling, Isotonic Regression, etc., may be used to calibrate the confidence scores before comparing to the threshold.

With respect to the final review process 350 illustrated in FIG. 3, low quality labels and high quality labels are received from the label consolidation and quality scoring process 330. The low-quality labels are routed for further review 352, e.g., by human labels. In some implementations, the low quality labels may be routed back to the AI ensemble label generation process 310 or label consolidation and quality scoring process 330 and re-processed after adjusting appropriate parameters, such as the predetermined thresholds, to try to improve the quality of the labels. The high-quality labels from the label consolidation and quality scoring process 330 and the verified or corrected labels from the review 352 are routed for storage in the final dataset 354, which serves as the high quality labeled document extraction dataset. The final dataset 354 may then be used for training 360 machine learning models for information extraction tasks.

In some implementations, the quality scores produced by the label consolidation and quality scoring process 330 are normalized and calibrated, e.g., such that the quality scores for the consolidated label ranges from 0-1 and comparable across different data elements and labels from different annotators. Even with human review, not every single consolidated label will have a quality score of 1. In order to take maximal advantage of the scale of the AI labeled data, a dataset with a high but varying quality score (e.g. quality score between 0.8-1) may be used to train the model. In order to capture the nuance of the imperfect label (quality score <1), the noise aware training objective function is implemented to weigh the loss term proportionally to the label quality score.

Figure 10:
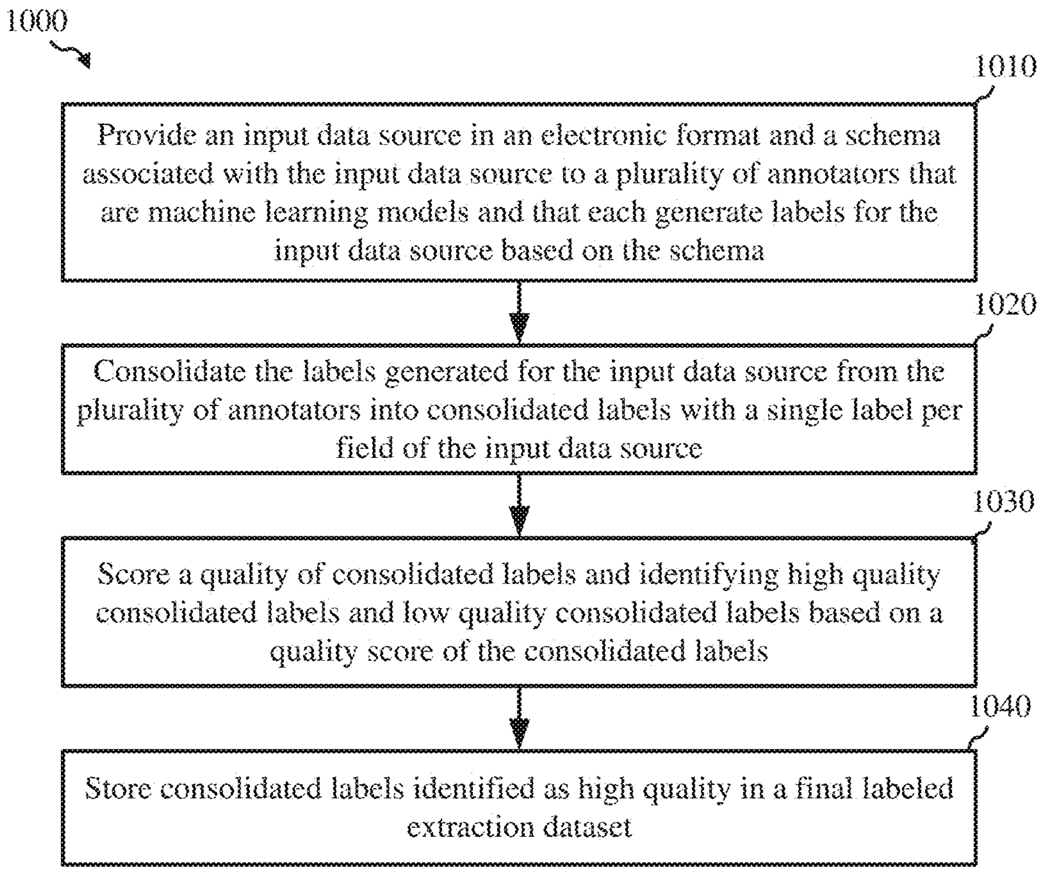
FIG. 10 illustrates a flowchart depicting an example method for generating a labeled extraction dataset for training machine learning models for information extraction tasks, in accordance with some implementations.

FIG. 10 shows an illustrative flowchart depicting an example method 1000 for generating a labeled extraction dataset for training machine learning models for information extraction tasks, as discussed herein. The labeled extraction dataset for training machine learning models for information extraction tasks may be generated for any desired type of data source, including document inputs, which may include textural or image inputs, or other types of data sources including visual inputs such as image or video inputs, audio or speech inputs, code, scientific or other structured data inputs, etc. The method 1000 is described as a computer-implemented method, e.g., which may be performed by the system 100 illustrated in FIG. 1, e.g., configured with the architecture 300 shown in FIG. 3.

At 1010, an input data source in an electronic format and a schema associated with the input data source are provided to a plurality of annotators that are machine learning models and that each generate labels for the input data source based on the schema, e.g., as discussed with respect to the AI ensemble label generation process 310 and AI ensemble labeling pipeline 322 illustrated in FIG. 3. The schema, for example, may be used for at least one of constructing a data source type specific prompt for labeling to large language models among the plurality of annotators, and associating a value to schema key names using title as a reference for title-value detection based models among the plurality of annotators, e.g., as discussed in reference to systems 700 and 800 in FIGS. 7 and 8, respectively.

At 1020, the labels generated for the input data source from the plurality of annotators are consolidated into consolidated labels with a single label per field of the input data source, e.g., as discussed with respect to the label consolidation and quality scoring process 330 and label consolidation pipeline 332 illustrated in FIG. 3.

At 1030, the quality of consolidated labels are scored and high quality consolidated labels and low quality consolidated labels are identified based on a quality score of the consolidated labels, e.g., as discussed with respect to the label consolidation and quality scoring process 330 and label quality scoring/calibration unit 334 illustrated in FIG. 3.

At 1040, consolidated labels identified as high quality are stored in a final labeled extraction dataset, e.g., as discussed with respect to the final review process 350 and the final dataset 354 illustrated in FIG. 3. In some implementations, the method may include routing consolidated labels identified as low quality for human review, e.g., as discussed with respect to the final review process 350 and the review 352 illustrated in FIG. 3.

At 1050, a machine learning model is trained for information extraction tasks using the final labeled extraction dataset, e.g., as discussed with respect to the final review process 350 and the training 360 illustrated in FIG. 3.

In some implementations, the method may further include providing to a large language model the input data source and a prompt to elicit the schema associated with the input data source if a reference schema for the input data source is not pre-existing, e.g., as discussed with respect to the AI ensemble label generation process 310 and machine learning assisted schema inference 316 illustrated in FIG. 3.

In some implementations, consolidating the labels is based on a majority vote in which a label generated by a majority of the plurality of annotators is selected as a consolidated label, e.g., as discussed in reference to majority vote 912 for label consolidation pipeline 910 in FIG. 9. In some implementations, a label generated by a default annotator in the plurality of annotators may be selected as a consolidated label if a majority of the plurality of annotators does not generate a same label, e.g., as discussed in reference to majority vote 912 for label consolidation pipeline 910 in FIG. 9.

In some implementations, consolidating the labels uses a Judge Large Language Model, e.g., as discussed in reference to LLM-As-a-Judge 914 for label consolidation pipeline 910 in FIG. 9. In some implementations, a label is used as the consolidated label if all of the plurality of annotators are in agreement, and remaining labels are provided to the Judge Large Language Model to generate the consolidated labels, e.g., as discussed in reference to LLM-As-Judge 914 for label consolidation pipeline 910 in FIG. 9.

In some implementations, consolidating the labels is based on a Bayesian inference, e.g., as discussed in reference to Bayesian inference 916 for label consolidation pipeline 910 in FIG. 9. In some implementations, the Bayesian inference is based on annotator reliability determined based on label accuracy of an annotator in each field using a label ground truth, wherein for each unique label value a posterior probability of a true label being a particular observed unique label value is determined and a label with a highest posterior probability is returned as the consolidated label, e.g., as discussed in reference to Bayesian inference 916 for label consolidation pipeline 910 in FIG. 9. Additionally, in some implementations, scoring the quality of consolidated labels may be based on the posterior probability determined for the label returned as the consolidated label, e.g., as discussed in reference to Bayesian score 924 for label quality scoring and calibration pipeline 920 in FIG. 9.

In some implementations, scoring the quality of consolidated labels may include determining a percentage of the plurality of annotators in agreement with the consolidated label and identifying high quality consolidated labels and low quality consolidated labels based on the percentage of the plurality of annotators in agreement, e.g., as discussed in reference to agreement percentage 922 for label quality scoring/calibration pipeline 920 in FIG. 9.

In some implementations, each of the plurality of annotators produces a confidence score associated with each generated label, and consolidating the labels produces a corresponding calibrated confidence score that is used for scoring the quality of consolidated labels, e.g., as discussed with respect to the AI ensemble label generation process 310 and AI ensemble labeling pipeline 322 illustrated in FIG. 3, and in reference to confidence score 926 for label quality scoring and calibration pipeline 920 in FIG. 9. The method may further include calibrating the confidence scores produced by each of the plurality of annotators based on a labeled dataset, e.g., as discussed in reference to confidence score 926 for label quality scoring and calibration pipeline 920 in FIG. 9.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "generating," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the broadest scope consistent with this disclosure, the principles and the novel features disclosed herein.

What is claimed is:

1. A method for generating a labeled extraction dataset for training machine learning models for information extraction tasks, comprising:

providing an input data source in an electronic format and a schema associated with the input data source to a plurality of annotators that are machine learning models and that each generate labels for the input data source based on the schema;

consolidating the labels generated for the input data source from the plurality of annotators into consolidated labels with a single label per field of the input data source;

scoring a quality of each consolidated label and identifying high quality consolidated labels and low quality consolidated labels based on a quality score for each consolidated label;

storing consolidated labels identified as high quality in a final labeled extraction dataset; and training a machine learning model for information extraction tasks using the final labeled extraction dataset.

2. The method of claim 1, further comprising providing to a large language model the input data source and a prompt to elicit the schema associated with the input data source if a reference schema for the input data source is not preexisting.

3. The method of claim 1, wherein the schema is at least one of: used to construct a data source type specific prompt for labeling to large language models among the plurality of annotators, and used to associate a value to schema key names using title as a reference for title-value detection based models among the plurality of annotators.

4. The method of claim 1, wherein consolidating the labels is based on a majority vote in which a label generated by a majority of the plurality of annotators is selected as a consolidated label, wherein a label generated by a default annotator in the plurality of annotators is selected as a consolidated label if a majority of the plurality of annotators does not generate a same label.

5. The method of claim 1, wherein consolidating the labels uses a Judge Large Language Model, wherein a label is used as a consolidated label if all of the plurality of annotators are agreement in, and remaining labels are provided to the Judge Large Language Model to generate the consolidated labels.

6. The method of claim 1, wherein consolidating the labels is based on a Bayesian inference, wherein the Bayesian inference is based on annotator reliability determined based on label accuracy of an annotator in each field using a label ground truth, wherein for each unique label value a posterior probability of a true label being a particular observed unique label value is determined and a label with a highest posterior probability is returned as a consolidated label.

7. The method of claim 6, wherein scoring the quality of each consolidated label is based on the posterior probability determined for the label returned as the consolidated label.

8. The method of claim 1, wherein scoring the quality of each consolidated label comprises determining a percentage of the plurality of annotators in agreement with a consolidated label and identifying high quality consolidated labels and low quality consolidated labels based on the percentage of the plurality of annotators in agreement.

9. The method of claim 1, wherein each of the plurality of annotators produces a confidence score associated with each generated label, and consolidating the labels produces a corresponding calibrated confidence score that is used for scoring the quality of each consolidated label, and the method further comprising calibrating confidence scores produced by each of the plurality of annotators based on a labeled dataset.

10. The method of claim 1, further comprising routing consolidated labels identified as low quality for human review.

11. A system for generating a labeled extraction dataset for training machine learning models for information extraction tasks, comprising:

one or more processors; and a memory communicatively coupled with the one or more processors and storing instructions that, when executed by the one or more processors, causes the one or more processors to be configured as:

provide an input data source in an electronic format and a schema associated with the input data source to a plurality of annotators that are machine learning models and that each generate labels for the input data source based on the schema;

consolidate the labels generated for the input data source from the plurality of annotators into consolidated labels with a single label per field of the input data source;

score a quality of each consolidated label and identifying high quality consolidated labels and low quality consolidated labels based on a quality score for each consolidated label;

store consolidated labels identified as high quality in a final labeled extraction dataset; and train a machine learning model for information extraction tasks using the final labeled extraction dataset.

12. The system of claim 11, wherein the one or more processors are further configured to provide to a large language model the input data source and a prompt to elicit the schema associated with the input data source if a reference schema for the input data source is not pre-existing.

13. The system of claim 11, wherein the schema is at least one of used to construct a data source type specific prompt for labeling to large language models in the plurality of annotators, and used to associate a value to schema key names using title as a reference for title-value detection based models in the plurality of annotators.

14. The system of claim 11, wherein the one or more processors are configured to consolidate the labels based on a majority vote in which a label generated by a majority of the plurality of annotators is selected as a consolidated label, wherein a label generated by a default annotator in the plurality of annotators is selected as a consolidated label if a majority of the plurality of annotators does not generate a same label.

15. The system of claim 11, wherein the one or more processors are configured to consolidate the labels using a Judge Large Language Model, wherein a label is used as a consolidated label if all of the plurality of annotators are in agreement, and remaining labels are provided to the Judge Large Language Model to generate the consolidated labels.

16. The system of claim 11, wherein the one or more processors are configured to consolidate the labels using a Bayesian inference, wherein the Bayesian inference is based on annotator reliability determined based on label accuracy of an annotator in each field using a label ground truth, wherein for each unique label value a posterior probability of a true label being a particular observed unique label value is determined and a label with a highest posterior probability is returned as a consolidated label.

17. The system of claim 16, wherein the one or more processors are configured to score the quality of each consolidated label based on the posterior probability determined for the label returned as a consolidated label.

18. The system of claim 11, wherein the one or more processors are configured to score the quality of each consolidated label by being configured to determine a percentage of the plurality of annotators in agreement with a consolidated label and identifying high quality consolidated labels and low quality consolidated labels based on the percentage of the plurality of annotators in agreement.

19. The system of claim 11, wherein each of the plurality of annotators produces a confidence score associated with each generated label, and the one or more processors are configured to consolidate the labels by producing a corresponding calibrated confidence score that is used for scoring the quality of each consolidated label, wherein the one or more processors are further configured to calibrate confidence scores produced by each of the plurality of annotators based on a labeled dataset.

20. The system of claim 11, wherein the one or more processors are further configured to route consolidated labels identified as low quality for human review.

* * * * *